JAMES M. LUMBARD.

Improvement in Potato and Peanut Diggers.

No. 125,968. Patented April 23, 1872.

Witnesses:
P. C. Dieterich
Geo. W. Mabee

Inventor:
J. M. Lumbard

Attorneys.

No. 125,968

UNITED STATES PATENT OFFICE.

JAMES M. LUMBARD, OF DECATUR, MICHIGAN.

IMPROVEMENT IN POTATO-DIGGERS.

Specification forming part of Letters Patent No. 125,968, dated April 23, 1872.

Specification describing a new and Improved Potato and Pea-nut Digger, invented by JAMES M. LUMBARD, of Decatur, in the county of Van Buren and State of Michigan.

Figure 1:
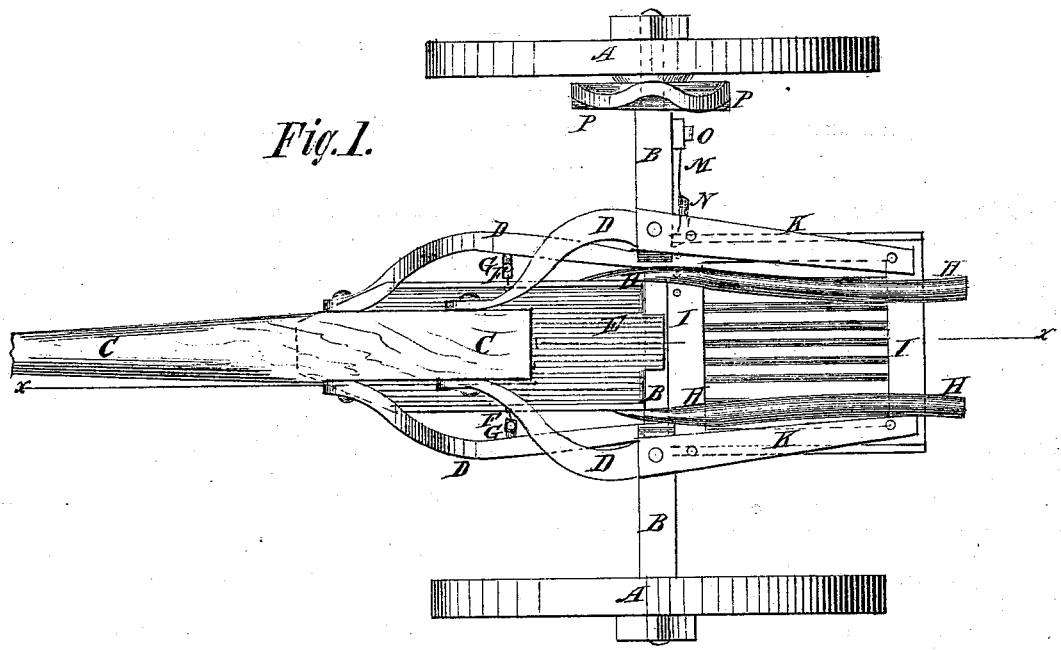
Figure 2:
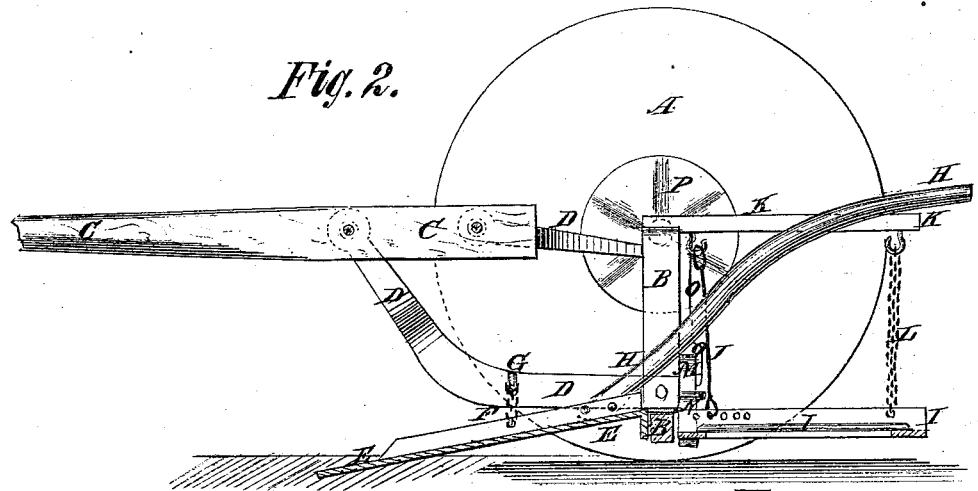
Figure 3:
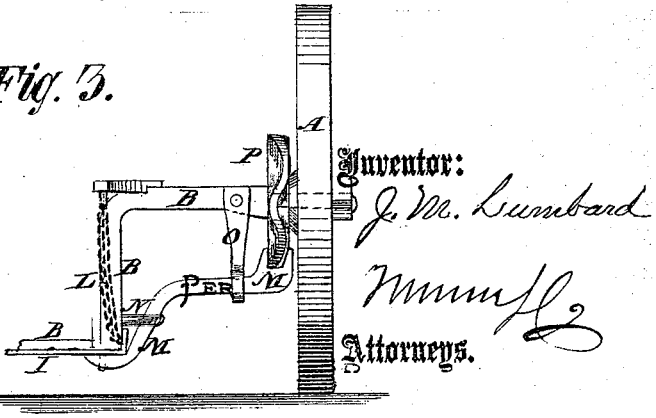

Figure 1 is a top view of my improved machine. Fig. 2 is a detail vertical longitudinal section of the same taken through the line $x\,x$, Fig. 1. Fig. 3 is a detail rear view of a part of the machine.

Similar letters of reference indicate corresponding parts.

The invention will be first hereinafter fully described, and then clearly pointed out in the claim.

A are the wheels, which revolve upon the journals of the axle B. The axle B is bent four times at right angles, so as to bring its middle part nearly to the ground. C is the tongue, the rear end of which is rigidly connected with the bent axle B by four brace-arms, D. E is the plow or scoop, the middle part of the rear end of which rests upon the upper side of the lower middle part of the axle B. The end parts of the rear end of the scoop E are bent downward and rest against the forward side of the middle part of the axle B, to resist the draft-strain upon the said scoop. The scoop E is supported at any desired inclination, and the downward pressure upon it is sustained by short chains F, the lower ends of which are attached to the side flanges of the scoop E, and which are hooked upon hooks G attached to the lower brace-bars D. To the sides of the rear part of the scoop E are attached arms or levers H, which curve upward and rearward into such a position that they may be conveniently reached and operated by the operator. I is a screen or shaker, which is slotted longitudinally, or is formed by attaching longitudinal bars or rods to a rectangular frame. The sides of the frame of the shaker I are flanged, as shown in Figs. 1 and 2, to prevent the potatoes from rolling off at the sides, and compel them to pass off at the rear end. The forward end of the shaker I rests against the rear side of the lower parts of the axle B, so as to receive the potatoes and soil from the rear end of the scoop E, and is suspended by the rods or chains J, the lower ends of which are pivoted to the forward side parts of the said shaker I. The upper parts of the rods or chains J are hooked upon hooks attached to the arms K, the forward ends of which are securely attached to the axle B. The rear part of the shaker I is supported at any desired inclination by the rods or chains L, the lower ends of which are pivoted to the rear parts of the sides of the shaker I, and their upper parts are hooked upon hooks attached to the rear part of the arms K. To the forward part of the shaker I is attached the inner end of the bar M. The inner part of the bar M is kept from being forced to the rearward by a guide, N, attached to the axle B. The outer part of the bar M is supported by the guide-bar O, through a slot in the lower end of which the said bar M passes. The upper end of the bar O is connected with the axle B. Upon the outer end of the bar M is formed an upwardly-projecting fork, which takes hold of the edge of the wheel P. The edge of the wheel P is made zigzag, so that the said wheel by its revolution may move the bar M longitudinally, and thus shake the screen I laterally, to shake off the soil from the potatoes, which soil passes down through the slotted bottom of said screen, while the potatoes pass back and fall from its rear end. The zigzag wheel P may be connected with the wheels A by a clutch, and may be provided with a lever, so that it may be thrown into and out of gear as required. The zigzag wheel P may be replaced with gear-wheels, if desired.

Having thus described my invention, I claim as new and desire to secure by Letters Patent—

The arms D D and bent axle B, in combination with scoop E, having handles H H, and supported in front by chains F F, as and for the purpose set forth.

JAMES M. LUMBARD.

Witnesses:
 MARVIN HINKLEY,
 MATTIE HINKLEY.